United States Patent [19]
Taylor et al.

[11] Patent Number: 5,486,675
[45] Date of Patent: Jan. 23, 1996

[54] PLASMA PRODUCTION OF ULTRA-FINE CERAMIC CARBIDES

[75] Inventors: Patrick R. Taylor; Shahid A. Pirzada, both of Moscow, Id.

[73] Assignee: Idaho Research Foundation, Moscow, Id.

[21] Appl. No.: 292,361

[22] Filed: Aug. 18, 1994

Related U.S. Application Data

[60] Division of Ser. No. 792,790, Nov. 15, 1991, Pat. No. 5,369,241, which is a continuation-in-part of Ser. No. 658,649, Feb. 22, 1991, abandoned.

[51] Int. Cl.[6] .................................................. B23K 10/00
[52] U.S. Cl. ........................... 217/121.59; 219/121.43; 219/121.37; 373/18; 373/25; 75/10.19
[58] Field of Search ........................ 219/121.59, 121.47, 219/121.36, 121.37, 75, 121.43; 373/18–22, 25; 75/10.19

[56] References Cited

U.S. PATENT DOCUMENTS

| | | | |
|---|---|---|---|
| Re. 32,908 | 4/1989 | Pfender | 427/37 |
| 4,707,583 | 11/1987 | Kim et al. | 219/121 P |
| 5,194,234 | 5/1993 | Weimer et al. | 423/297 |
| 5,348,718 | 9/1994 | Carter et al. | 423/291 |
| 5,369,241 | 11/1994 | Taylor et al. | 219/121.47 |

OTHER PUBLICATIONS

Report entitled "Preparation of Silicon Carbide from Methylchlorosilanes in a Plasma Torch", by Salinger.
Report entitled "R.F." plasma system for the production of ultrafine, ultrapure silicon carbide powder by C. M. Hollabuagh, et al.
Report entitled "Preparation of UltraFine Refractory Powders Using The Liquid–Wall Furnace" by I. G. Sayce, et al.
"Preparation of Ultra Fine Powders of Refractory Carbides In An Arc–Plasma", by S. F. Excell, et al., pp. 164–177, Battelle Geneva Research Center, Switzerland.
Article entitled "Syntheses of Ultrafine Silicon Carbide Powders in Thermal Arc Plasmas" by P. Kong, et al., IEEE Transactions on Plasma Science vol. PS–14.
"Preparation of Ultrafine SiC Particles by Gas Evaporation" by Yoshinori Ando, et al., Dept. of Physics, Meijo University, Tempaku, Nagoya, Japan 468.
"Preparation of SiC Powders from SiO2 Powders from SiO2 Powders by RF–Plasma Technique" by Osamu Asakami, et al., J. Ceram. Soc. Jpn. Inter. Ed. vol. 96 [1173–1174] (1988).
"The Formation of Silicon Carbide in the Electric Arc" by W. E. Kuhn, vol. 110, No. 4, pp. 298–306, Journal of the Electrochemical Society, Apr. 1963.
"Production of B–Silicon carbide ultrafine powder by plasma synthesis" by O. de Pous–Battelle, et al.
"Plasma Synthesis and Characterization of Ultrafine SiC" by G. J. Vogt, et al., pp. 203–215.

Primary Examiner—Mark H. Paschall
Attorney, Agent, or Firm—Graybeal Jackson Haley & Johnson

[57] ABSTRACT

An apparatus and method for the synthesis of ultra-free (submicron) ceramic carbides in a thermal plasma torch reactor using primarily silica, boron oxide, titanium dioxide or other oxides as metal sources and methane as a reductant. A plasma torch operated with both argon and helium as plasma gases and having methane as a primary carrier gas is connected to the plasma reactor for providing the heat necessary to carry out the reaction. A collection chamber with both interior and exterior cooling is connected to the reactor for quenching of the reactants. Cooling is provided to the torch, the reactor and the collection using coils, baffles and jackets.

12 Claims, 9 Drawing Sheets

PLASMA PRODUCTION OF ULTRA-FINE CERAMIC CARBIDES

RELATED APPLICATIONS

This is a divisional of the CIP application Ser. No. 07/792,790, now U.S. Pat. No. 5,369,241 filed Nov. 15, 1991, which is a continuation in part of the parent U.S. application Ser. No. 07/658,649 filed Feb. 22, 1991, now abandoned the contents all of which are incorporated herein, the benefit of the filing dates of which are hereby claimed under 35 USC 120.

TECHNICAL FIELD OF THE INVENTION

This invention relates to a method and apparatus for the production of ceramic carbides to be used in the development and manufacturing of high value materials. The method and apparatus comprise a plasma torch, a reaction chamber and a rapid quenching chamber.

BACKGROUND OF THE INVENTION

The relatively new trend in silicon carbide formation is to make it by thermal plasma processes. The high temperatures available in the plasma increase the reaction kinetics by several orders of magnitude and fast quenching rates produce very small particles at high conversion rates, thus providing a number of advantages over older methods for producing very fine, submicron powders of SiC. The gas phase synthesis conducted in a pure and controlled atmosphere at a high temperature gives the powder which is produced properties which are very desirable in subsequent fabrication. These properties include high sphericity, a small diameter and a narrow size distribution.

Plasma processing has a wide range of potential applications, ranging from coating of thin layers on substrates to the destruction of toxic wastes. One of the many promising areas of plasma processing is the production of ultra-time (submicron size) powders of high-value materials (such as carbides and nitrides). Powders produced in a pure and controlled atmosphere may be essential for subsequent fabrication of advanced materials. Silicon carbide has many eminent properties, such as: high refractoriness, high oxidation resistance and high hardness. It also has a thermal conductivity comparable to the metals, and its thermal expansion coefficient is relatively low compared with other ceramics. Because of these properties, silicon carbide can be effectively used for high temperature mechanical applications. The products obtained by the present invention can be employed for those purposes for which ceramic carbides are presently used.

A fundamental prerequisite for producing such structural ceramics depends on the availability of relatively inexpensive, high purity, reproducibly-sinterable SiC powders. One of the more important problems in the application of SiC is its poor sinterability, which is due to strong covalent bonds between molecules. In order to enhance sintering characteristics, the silicon carbide powder must have a uniform particle size distribution and a submicron mean particle size.

There have been a number of investigations concerning the production of SiC powder in plasma reactors. In most of the investigations, the reactants used (e.g., silane) are quite expensive. These reactants are used because they are easily vaporized and therefore easily converted. Silicon carbide has been produced using inexpensive reactants, such as silica and hydrocarbons, with an RF plasma. However, RF plasmas may present a thermal efficiency problem when scaled up to an industrial size.

Many investigators have studied and analyzed the mechanism and kinetics of silicon carbide formation in the silica-carbon system. They have proposed different intermediate species during the reaction, which vary over the temperature range used. The overall reaction between silica and carbon, which is endothermic, may be written as:

$SiO_2$ (s)+$3C$ (s)=$SiC$ (s)+$2CO$ (g)

This reaction, as written, is very slow even under plasma reactor conditions; so the reaction rates must be increased by the formation of gaseous intermediaries. In this invention, the reactants for the SiC formation are silica and methane. When silica is exposed to high temperature (>2839° C.), it disassociates into silicon monoxide and oxygen, i.e., $SiO_2(s)=SiO(g)+O(g)$ H. L. Schick, "A Thermodynamic Analysis of the High-Temperature Vaporization Properties Silica," Chem. rev. (1960), gave a detailed thermodynamic analysis of the high temperature vaporization properties of silica. D. M. Caldwell, "A Thermodynamic Analysis of the Reduction of Silicon Oxides Using a Plasma," High Temperature Science, (1976), presented a computer model for the silicon-oxygen-carbon system. He showed that a threshold temperature exists, at approximately 2400° K., for the maximum yield of silicon and silicon carbide.

When methane is exposed to high temperature, it decomposes into different species depending upon the temperature. The important reactions for the methane decomposition are as follows:

$2CH_4(g)=C_2H_2(g)+3H_2(g)$ $2CH_4(g)=2C$ (s)+$4H_=(g)$ $2CH_4(g)=C_2H$ (g)+$3.5H_2(g)$

The formation of acetylene by the thermal decomposition of methane is explained by the theory of free radicals and has been observed by a number of investigators, including the work reported here. The primary species formed when methane is exposed to high temperatures are: $H_2$, $C_2H_2$, $C_2H$ and $C$.

SUMMARY OF THE INVENTION

The purpose of the present invention is to design, build and operate a plasma reactor to synthesize ultra-fine SiC in a non-transferred arc plasma system using inexpensive reactants such as silica and methane. A new method and apparatus for producing pure, ultra-free uniform sized ceramic carbides has been developed which comprises a non-transferred arc plasma torch as a heat source, a tubular reactor as a reaction chamber, and a quench chamber for rapidly quenching products to minimize their re-oxidation.

The process uses the high temperatures of the plasma torch to vaporize oxides and to make gaseous suboxides of $SiO_2$, $B_2O_3$ and $TiO_2$ (such as silica, Boron oxide and Titanium oxide) and to thermally decompose methane (to form acetylene, carbon and hydrogen). The tubular reactor allows sufficient residence time (under the proper reaction conditions of temperature and partial pressures) for the formation of the ceramic carbides. The powders are collected, treated by roasting to remove excess carbon, and leached to remove excess metals and oxides. The product is pure, ultra-fine (0.2–0.4 micron) ceramic carbide.

DESCRIPTION OF THE PREFERRED EMBODIMENT

Although for ease of understanding the following description is directed to producing pure silicon carbide from silica and methane. Other ceramic carbides can be readily produced by the present invention. Novel and unusual features of the present invention would include the use of silica and methane in a non-transferred arc to form pure, fine silicon carbide; the use of boric acid or boron oxide and methane to form fine, pure boron carbide; and the development of tubular, laminar flow reactors to allow the development of proper reaction conditions. Other features would include the formation of pure, fine tungsten carbide powders using tungstic acid or tungsten oxide and methane; formation of pure, fine titanium carbide powders using titanium oxide and methane; thermal decomposition of methane to form acetylene and carbon; formation of fine silicon monoxide powder using silica; formation of fine silicon powder; formation of fine boron powder; and destruction of hazardous waste.

Thermodynamic Analysis

In the proposed reaction mechanism scheme, for silicon carbide formation, the reactor is divided into three zones. These zones are based on temperatures. The first zone 1 is the plasma jet or vaporization zone, where the temperature is considered to be above 3000° K. The second zone 3 is the reaction zone, where the temperature is between 2000° K. and 3000° K. The third zone 5 is the re-oxidation or quenching zone, where the temperature is less than 2000° K.

In the first zone 1, some of the reactions that are possible are given as follows:

$$SiO_2\ (s) = SiO_2\ (g) \tag{1}$$

$$SiO_2\ (s) = SiO\ (g) + \tfrac{1}{2}O_2\ (g) \tag{2}$$

$$SiO_2\ (g) + C\ (s,g) = SiO\ (g) + CO\ (g) \tag{3}$$

$$SiO\ (g) + C = Si\ (g) + CO\ (g) \tag{4}$$

$$SiO_2\ (g) + CO = SiO\ (g) + CO_2(g) \tag{5}$$

$$SiO_2 + H_2 = SiO\ (g) + H_2O \tag{6}$$

$$CH_4 = C + 2H_2 \tag{7}$$

$$2CH_4 = C_2H_2 + 3H_2 \tag{8}$$

$$2CH_4 = C_2H + 3.5H_2 \tag{9}$$

$$C\ (s) = C\ (g) \tag{10}$$

$$C\ (s) + \tfrac{1}{2}O_2 = CO\ (g) \tag{11}$$

Figure 11:
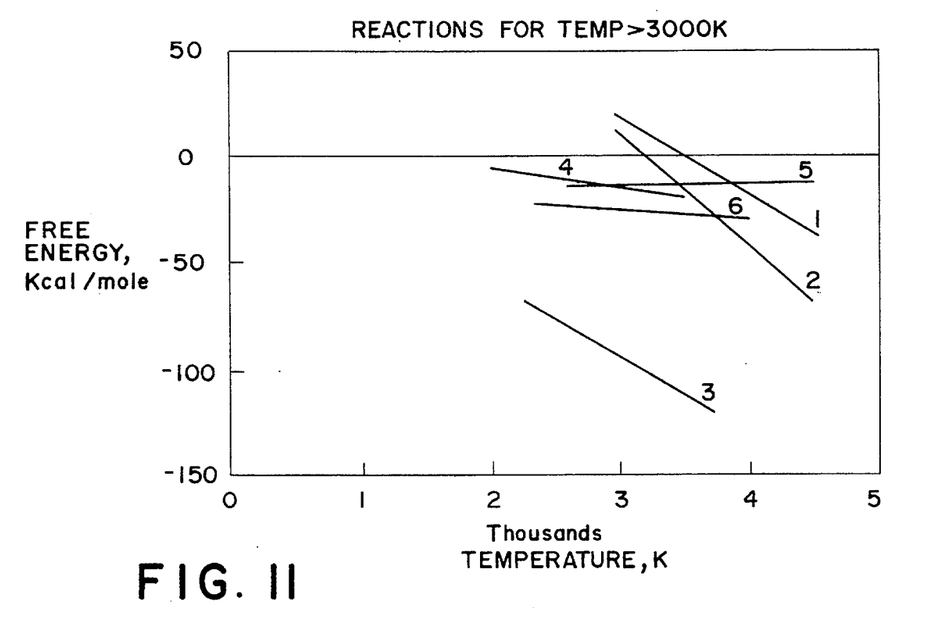
FIG. 11 is the free energy in kcal/mole versus temperature in kelvin for temperatures above 3000 degrees kelvin.

The free energies of formation of some of these reactions, in the temperature zone of T>3000° K., versus temperature are shown in FIG. 11. In this temperature zone most of the reactants are in a gaseous state. The main reactions in this temperature zone are the formation of SiO(g), Si(g), $H_2$(g), $C_2H_2$(g), $C_2H$(g), CO(g), and C(s,g).

For the reaction zone 2 where 2000° K.<T<3000° K., some of the possible reactions are given as:

$$SiO\ (g) + C\ (s) = Si\ (g\ or\ l) + CO\ (g) \tag{4}$$

$$SiO\ (g) + 2C\ (s) = SiC\ (s) + CO\ (g) \tag{12}$$

$$Si\ (g) + C\ (s) = SiC\ (s) \tag{13}$$

$$SiO\ (g) + C_2H_2\ (g) = SiC\ (s) + H_2\ (g) + CO\ (g) \tag{14}$$

$$SiO\ (g) + C_2H\ (g) = SiC\ (s) + 0.5H_2\ (g) + CO\ (g) \tag{15}$$

$$Si\ (g) + C_2H\ (g) = SiC\ (s) + 0.5H_2(g) + C\ (s) \tag{16}$$

$$2Si\ (g,l) + C_2H_2\ (g) = 2SiC + H_2\ (g) \tag{17}$$

$$2Si\ (g) + CO = SiC\ (s) + SiO\ (g) \tag{18}$$

$$Si\ (g) + C_2H_2\ (g) = SiC\ (s) + C\ (s) + H_2\ (g) \tag{19}$$

Figure 12:
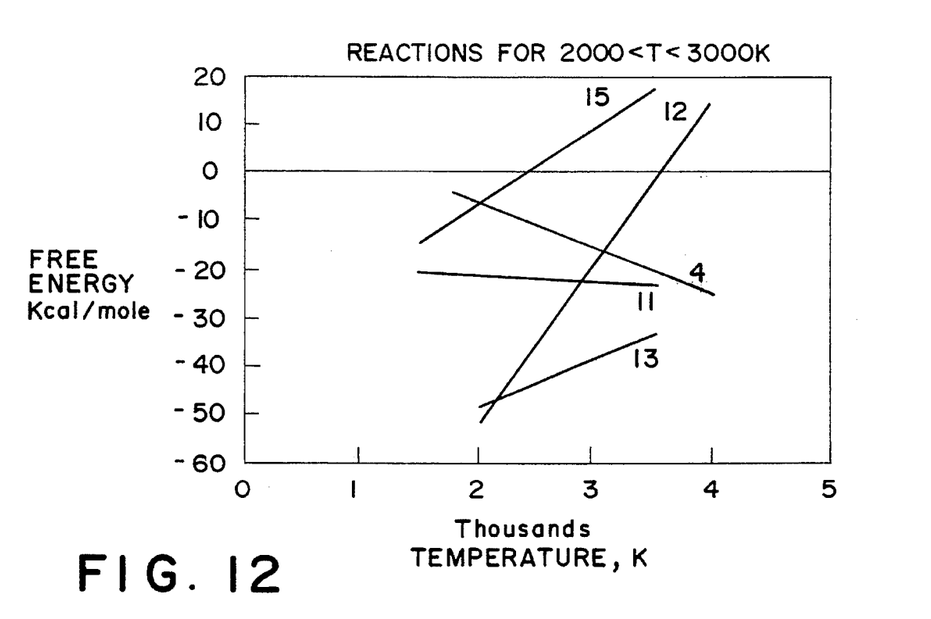
FIG. 12 is the free energy in kcal/mole versus temperature in kelvin in the temperature range above 2000 degrees kelvin but below 3000 degrees kelvin.

In this temperature region, there is the strongest tendency of silicon carbide formation. The free energy diagram for some of the above reactions is shown in FIG. 12. The main reaction products in this region are SiC(s), CO(g), and $H_2$(g).

In the quenching zone 5 where T<2000° K., the main reactions are given as follows:

$$SiO\ (g,s) + CO\ (g) = SiO_2\ (s) + C \tag{20}$$

$$Si\ (l) + 2CO\ (g) = SiO_2\ (s) + 2C \tag{21}$$

$$2Si\ (l,s) + CO\ (g) = SiC + SiO \tag{18}$$

$$SiC + 2CO = SiO_2 + 3C \tag{22}$$

$$2CO\ (g) = C\ (s) + CO_2(g) \tag{23}$$

$$2SiO\ (s) = Si(s) + SiO_2\ (s) \tag{24}$$

Figure 13:
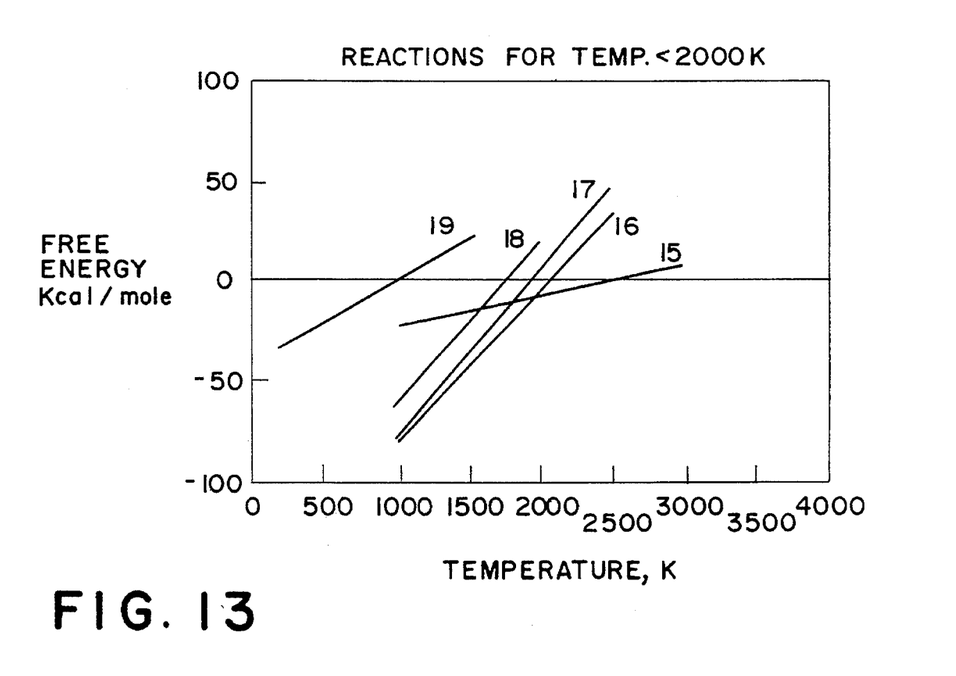
FIG. 13 is the free energy in k/mole versus temperature in kelvin for temperatures below 2000 degrees kelvin.

The free energy diagram for the above reactions is shown in FIG. 13. In this temperature region, both the thermodynamic and kinetic factors are unfavorable for significant formation of silicon carbide. This region can be considered a re-oxidation zone. If the quenching is sufficiently rapid (>10$^{40}$k/sec) and the gaseous atmosphere remains reducing, the re-oxidation reactions do not happen to any appreciable extent.

Apparatus

Figure 1:
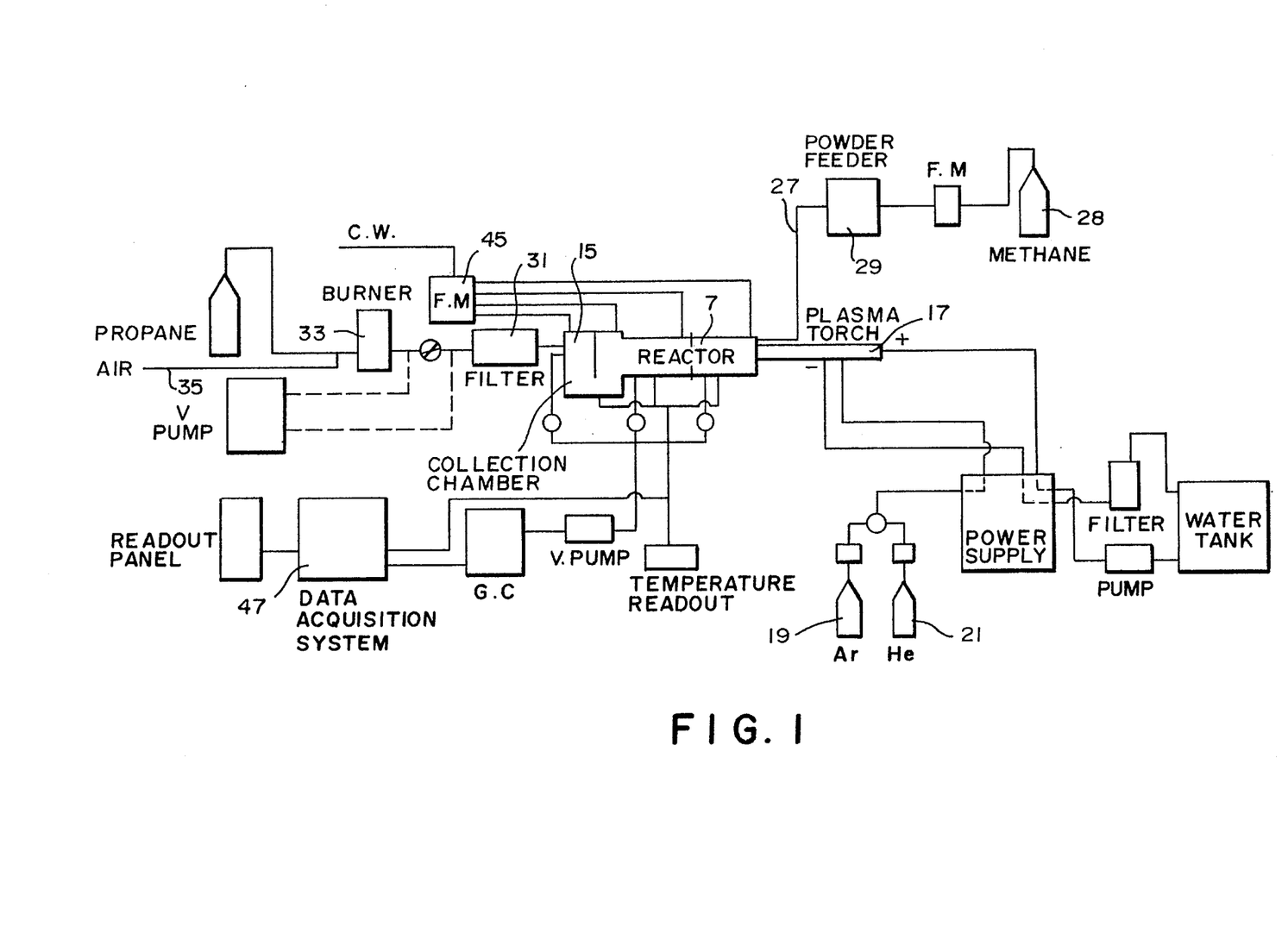
FIG. 1 is a schematic diagram of a plasma reactor system incorporating the reactor of the present invention.
Figure 9:
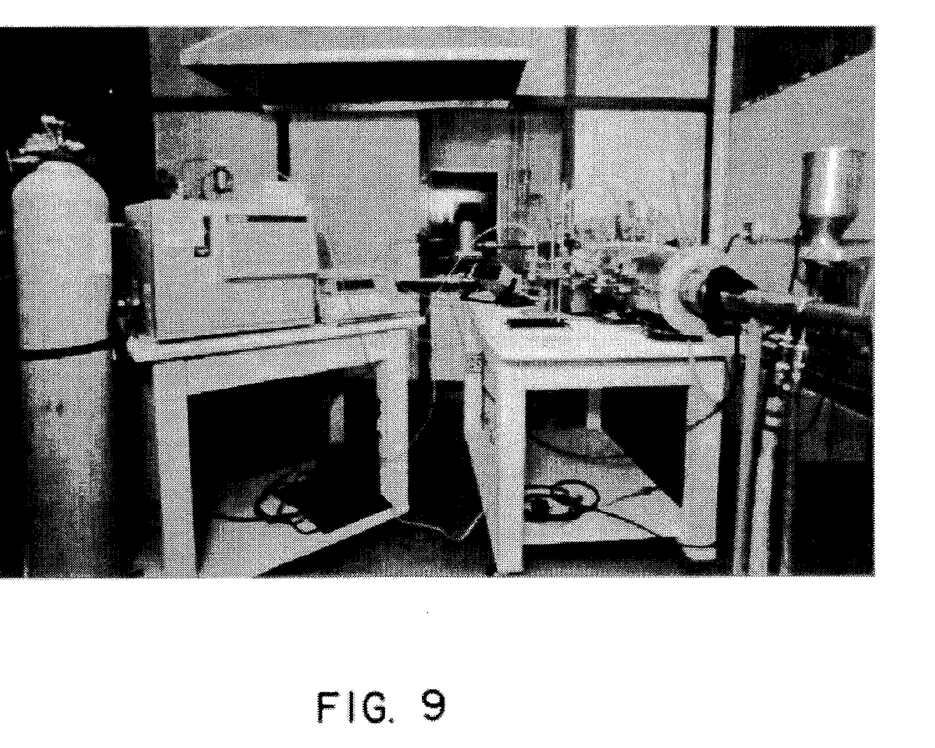
FIG. 9 is a photograph of the plasma reactor system according to the invention.

Referring to the drawings, a schematic of the present invention for the synthesis of ultra-free silicon carbides is shown in FIG. 1. A photograph of the system is shown in FIG. 9. The central part of the system comprises a tubular, water cooled, stainless steel reactor 7 constructed of 316 stainless steel; the reactor 7 design accommodates the high temperatures associated with the plasma torch 17. Theoretical calculations (see page 14, lines 8–12) are used to determine the temperature and velocity profiles expected in the reactor 7. Using a heat balance, the appropriate reactor diameter is estimated and the condensating rate control strategies of the particles present in the stream determined (the relationship between the internal diameter 57 of the reactor and the energy density at various power levels of the plasma torch 17 are taken into account). The time to complete the reaction is calculated using assumed kinetic equations. Having calculated the estimated reaction time, the length of the reaction chamber can be determined which will provide the reactants enough residence time in the reaction chamber to react (elutriation velocities for particles of different sizes were taken into account in determining the reactor 7 length).

Figure 2:
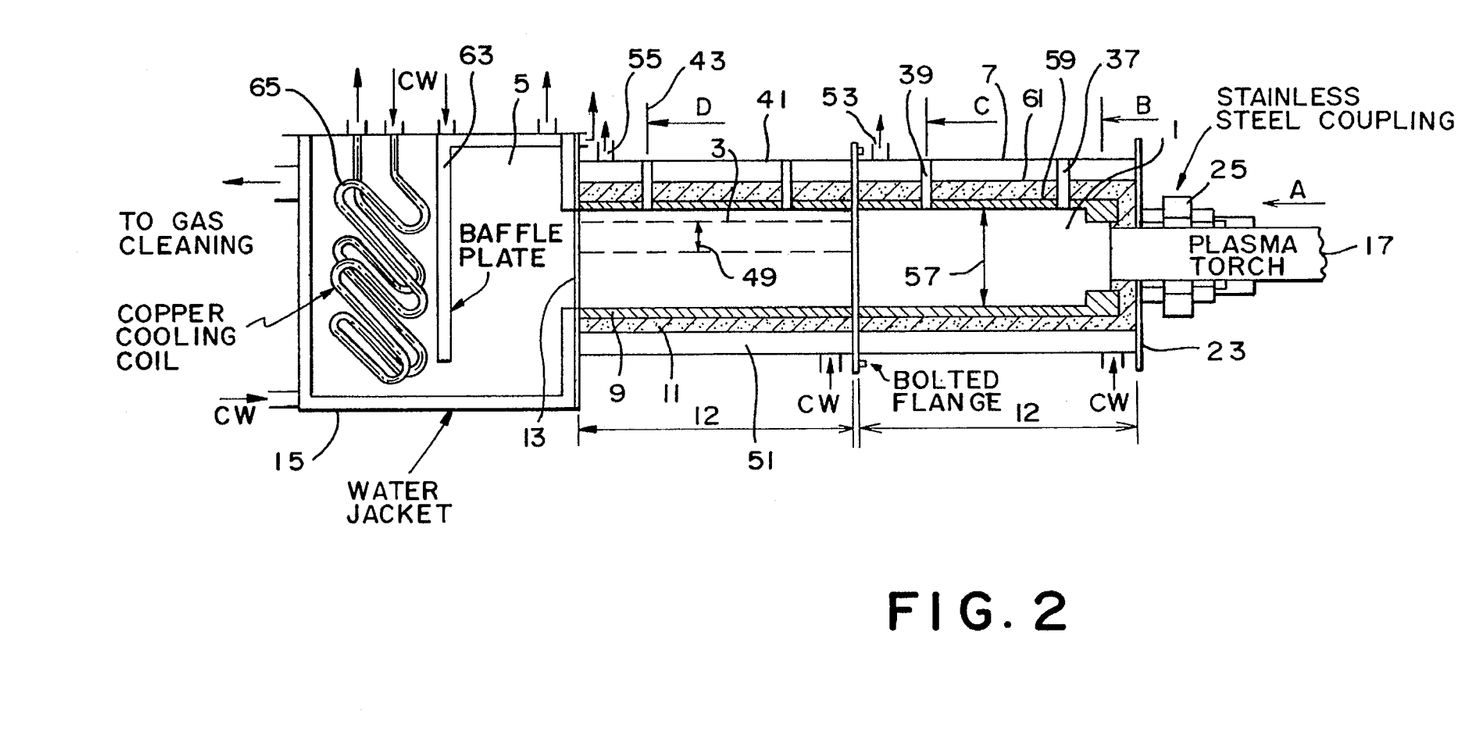
FIG. 2 is a sectional view of an embodiment of the reactor according to the invention.

A graphite tube 9 serves as the refractory lining of the reactor 7, protecting it from the high temperatures associated with the plasma torch. Because the graphite lining has high heat conductivity, to minimize heat loss it is necessary to insulate the graphite tube 9 with graphite felt 11, or zirconia felt but because of their low thermal conductivity and high refractoriness, several layers (5–6) of felt must be applied. The felt is placed between the graphite refractory 61 lining and the reactor inner wall 59.

At the periphery of the graphite felt are two one (1) foot water jackets, each jacket independent of the others having its own cooling circuits and lines, filters and thermocouples. At the discharge end of the reactor 13 is attached a collection chamber 15. The collection chamber 15 acts as a quenching chamber for the incoming gases, both by expansion and intensive water cooling. The chamber 15 resembles a rectangular box with a periphery water-cooled jacket. The collection chamber is constructed of 316 stainless steel. In the periphery water jackets and through a vertically disposed coolant baffle plate, water is circulated as a coolant. During operation, the incoming reactants encounter an intensively water-cooled quenching barrier which minimizes or prevents re-oxidization. In addition to the water jackets and the interior baffle plate, a copper cooling coil is provided oppositely disposed from the collection chamber entrance which provides further cooling to the incoming reactants. Once the gas stream passes the copper coil and exits the collection chamber, it has cooled to a temperature of approximately 150°–160° C. Teflon seals are provided on the cover to avoid any leakage from the collection chamber 5. The reactor 7 and the quenching section 15 are shown in FIG. 2.

A non-transferred arc plasma torch 17 (Model PT50 from Plasma Energy Corporation) provides the necessary heat for the reaction. The front electrode, connected to the negative terminal, serves as the cathode and the rear electrode, connected to the positive terminal, serves as the anode. Both electrodes are constructed of a copper chrome alloy and are intensively water cooled. A mixture of argon 19 and helium 21 is used as the plasma gas, the flow rates of the individual gases being adjusted and recorded separately. The torch is attached to a 96 KW D.C. power supply.

The plasma torch 17 is attached to the front portion 23 of the reactor 7 using a stainless steel coupling 25 in combination with an injection ring or other feeding arrangement which is used to feed the reactants; the connecting system is fabricated from 316 stainless steel. The stainless steel coupler serves to prevent leakage around the insertion area and permits easy removal of the plasma torch 17 for inspection or replacement. Insulating felt is used between the front portion 23 and the injection ring to mimimize the heat losses from the front section.

Prior to reaching the reaction chamber, a Metco powder feeder 29 (Model 3MP) comprising a hopper for powder storage, an adjustable speed rotating wheel and a vibrating system to prevent clogging feeds the powders combined with the gas stream into the reactor 7 through a copper tube. Using a graphite disc, reactants are radially fed into the reaction chamber 1 at three points. The reactants pass through the reactor, enter the collection chamber, are cooled, and subsequently exit the collection chamber; the exit gas temperature is approximately 150°–160° C.

Because the exiting gas stream contains fine particles, it is necessary to pass the stream through a stainless steel tubular filter 31. Various filtering materials can be used but preferably 0.5 micron size "Nomex" cloth filter with a folded periphery filter bag. Maximum efficiency was obtained using filter bags with as large of surface area as possible.

After filtration, the off gases are passed over a burner 33 for further combustion. This ensures full burning of the outgoing gases and converts the carbon monoxide present in the gases to carbon dioxide; the hazardous effects of the outgoing gases are minimized. The gases are then vented to a stack. Alternatively, the off gases can be recycled to increase the overall efficiency of the reactor, decrease production costs and reduce the hazardous effects of the off gases.

The reactor chamber includes multiple ports 37, 39, 41, 43 along the reactor 7 and the collection chamber. These ports are used to take samples of the gases and the solid species as they transition the reactor and collection chamber, and to monitor temperatures at various intervals in the reactor and the collection chamber; both "C" and "K" type thermocouples are used. (A two color pyrometer was used to measure the temperature of graphite lining (9) in the reaction zone. Temperatures in the first half of the reactor could not be measured by thermocouples because of the high temperatures associated with the plasma torch but could be estimated theoretically.)

Three sampling lines are mounted at different positions along the length of the reactor 7, each line comprising a 0.25 inch graphite tube inserted into the chamber, a microfilter, and a shut off valve. The lines are connected to a Varian gas chromatograph 45 (Model 3300) via a vacuum pump. The filter separates the solid species from the gaseous stream. The gas chromatograph removes the samples using a vacuum pump placed at the end of the sampling lines and has an air actuated auto-sampling valve which takes samples at specified times.

The information from the system, including temperature, flow rate, is interfaced with a data acquisition system. The data system comprises an IBM personal computer (Model 30) coupled with a "Metrabyte" analog and digital conversion boards. The conversion boards are connected to the thermocouple, flow sensors, pressure transducers and power supply parameters.

EXAMPLE

Figure 5:
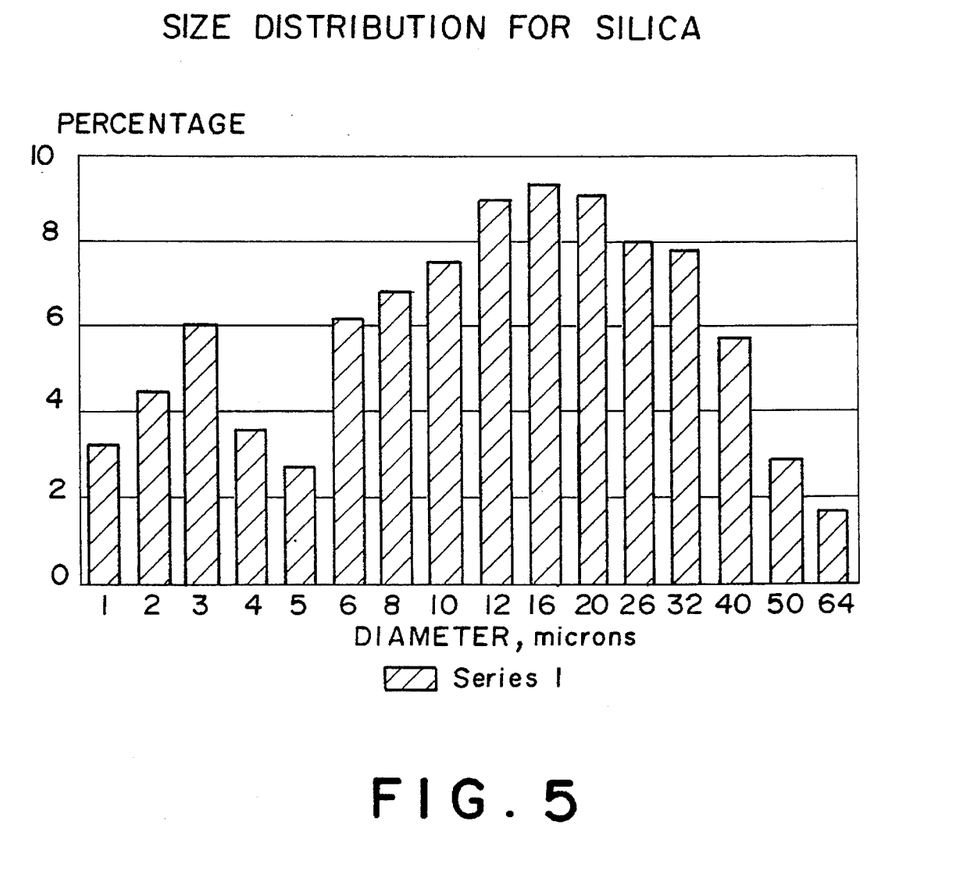
FIG. 5 is a size distribution bar chart of the silica powder used in the system.

Commercial grade silica powder and technical grade (about 97% minimum purity) methane 28 are the primary reactants for the synthesis of ultra-fine silicon carbide in the plasma reactor. The silica powder size distribution is shown in FIG. 5 and primarily it comprises 6 to 40 micron particles. The methane 28 is combined with the silica powder at the powder feeder and used as the carrier gas along the powder feeder and to feed the powder into the reaction chamber. Alternatively, a mixture of methane and argon can be used as the carrier gas where argon is simply added to maintain a fixed flow rate of the carrier gas. Flow rates for both gases are monitored using a mass flow meter and maintained at a delivery pressure for both gases of approximately 50 PSI. The silica powder is dried in an oven before each run to remove moisture and ensure proper feeding. Moisture in the system could disrupt the chemical balance of the system and induce clogging prior to the reactants entering the reaction chamber, thereby devoiding the system of all uniformity. The silica feed rate is maintained at about 5.0 g/min.

The plasma torch is operated using argon and helium as plasma gases filtered through a 15 micron filter. The plasma torch 17 is started with argon 19, but after about 10 minutes, helium 21 is added to enhance its power. Since helium has a higher ionization energy, the voltage across the electrodes is increased depending upon its flow rate and subsequently the power of the torch is increased. The argon and helium are maintained at a delivery pressure of 130 PSI at the source, however, due to many restrictions in the gas lines, the delivery pressure drops to 30 PSI at the torch. The flow rates for the argon and helium range between 3.5 to 4.0 SCFM (STP). The arc attachment is kept at the face of the cathode which provides a smooth arc for uniform erosion of the cathode. Operating parameters of the plasma torch for the first two sets of experiments are fixed and are given in Table 1.

TABLE 1

Operating parameters of the plasma torch for the first two sets of experiments.

| | |
|---|---|
| Voltage, V | 165–185 |
| Current, A | 175–190 |
| Power, KW | 28.9–35.2 |
| Argon Flow, CFPM | 3.5–4.0 |
| Helium Flow, CFPM | 3.5–4.0 |
| Argon Pressure, PSI | 130 |
| Helium Pressure, PSI | 130 |
| Feed Pressure, PSI | 28–30 |

Figure 3:
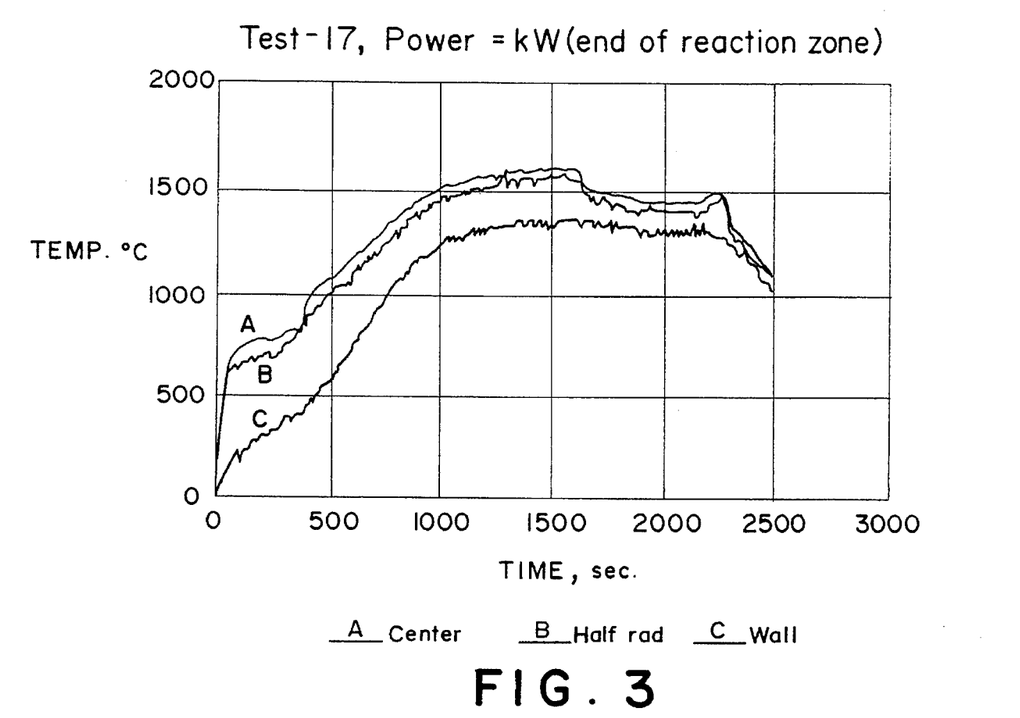
FIG. 3 is a graph of typical temperature profiles at the outlet end of the reaction chamber.

Temperatures are measured in the second section 3 of the reactor 7 using "C" type thermocouples. Example temperature profiles at the end of the reaction chamber versus time are given in FIG. 3. Curve "A" is the centerline temperature at the discharge end of the reactor, while curves "B" and "C" are the temperatures at the half radius 49 and the wall 9, respectively. As shown in the figure, the temperatures rise sharply in the beginning; this is a result of pre-heating the reactor without any reactants. After some minutes, the reactor attains a thermal equilibrium at which point the feed is started into the reactor; this is represented in FIG. 3 as a sudden drop in temperature.

Figure 4:
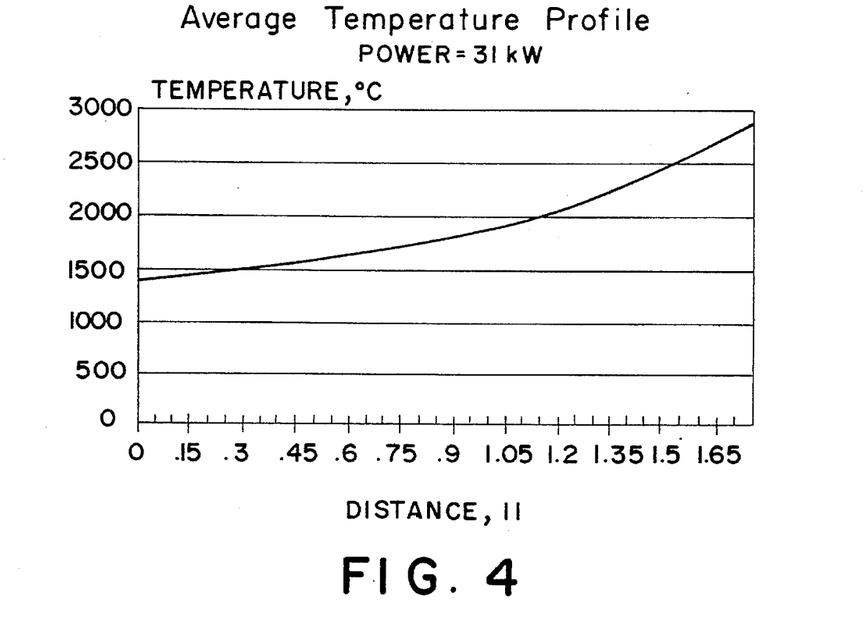
FIG. 4 is a graph of the average temperature profile in the reactor.

As the temperatures could not be measured in the reactor, except near the discharge 13, a theoretical approach was adopted to estimate the average temperatures along the length of the reactor 7. On the basis of knowledge of the temperature gradient in the second half of the reactor 3, and of the temperatures and flow rates of the cooling water at the outlets 53, 55 in both of the sections 1, 3, and considering the reactor 7 to be at a steady state, an average temperature profile in the reactor 7 was determined, using an energy balance, as shown in FIG. 4.

Figure 6:
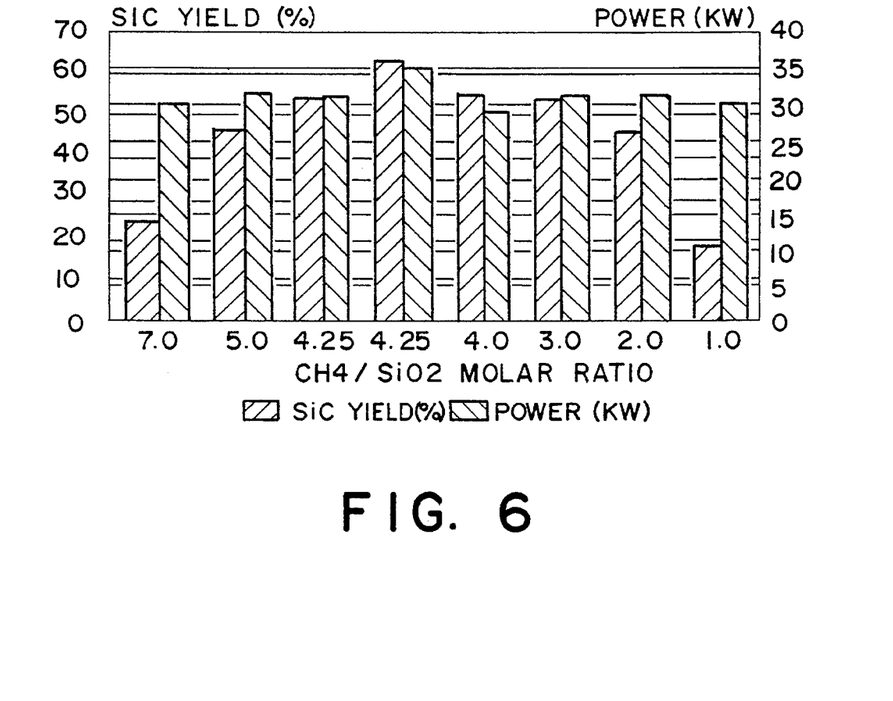
FIG. 6 is a bar chart showing SiC yield as a function of the methane/silica molar ratio.

For the first set of runs, the molar ratio of $CH_4:SiO_2$ was changed from seven to one. Products in these runs varied in color from black to grey; the procedures using surplus methane produced a black powder because of the excess free carbon in the product. Products in these runs consisted of free carbon, silicon monoxide, silicon, silicon dioxide, and silicon carbide. Example results are shown in Table II, and a comparison chart for SiC recovery is shown in FIG. 6. Gas analysis for these runs show that the off gases consisted of $H_2$, CO, $C_2H_2$, Ar, and He.

TABLE II

Example Results

| Experiment No. | Powder, KW | $CH_4/SiO_2$ m ratio | Free C, % | Recovery of SiC % |
|---|---|---|---|---|
| T-4 | 30 | 7.0 | 45.0 | 25.0 |
| T-27 | 31.5 | 5.0 | 38.5 | 46.7 |
| T-24 | 31 | 4.25 | 35.0 | 54.0 |
| T-21 | 35 | 4.25 | 33.0 | 62.8 |
| SN-6* | 30 | 4.25 | 41.0 | 77.2 |
| T-44 | 29 | 4.0 | 36.0 | 55.0 |
| T-32 | 31 | 3.0 | 10.6 | 53.5 |
| T-33 | 31 | 2.0 | ** | 45.7 |
| T-45 | 30 | 1.0 | ** | 18.5 |

*Lower heat losses through the reactor walls
**Not measured

Recovery of silicon carbide ranged from 25% to 77.2%. As shown in the comparison chart (FIG. 6), the SiC recovery in a methane/silica molar ratio range of 3–4.25 remains almost identical. But it can be improved with an increase in power of the plasma torch 17 (T-21). Silicon carbide recovery can also be increased by avoiding the re-oxidation of SiC by CO at the discharge end 13 of the reactor 7. (SN-6)

Alternatively, the above examples are followed except for the following substitutions: silica only; silica and C; silica and CO; silica, C and CO; silica and acetylene; silica, C and acetylene; methane only; and acetylene only. The purpose was to understand and confirm the reaction mechanism of the carbidization reaction.

Product Analysis

The powders produced are analyzed by chemical and physical characterization. Chemical quantitative analysis is performed for all the species present in the product. Physical characterization includes size, morphology, and size distribution of the powder.

Chemical Characterization

Qualitative analysis of the powder produced is performed by x-ray diffraction at two stages: first, it is analyzed in the as-produced form, and second, it is analyzed after chemical treatment. Chemical treatment consists of roasting the powders in air followed by leaching with HF acid and then a mixture of HF and $HNO_3$ acids. The as-produced powder shows free carbon, silicon, silicon monoxide, silicon dioxide, and beta-silicon carbide. The chemically treated powder only shows beta-silicon carbide.

Free Carbon

Free carbon in the sample is determined by oxidizing the sample in a tube furnace at a temperature of 650° C. The sample is placed in a ceramic boat in the furnace. A pre-adjusted air stream is passed through the tube. All free carbon present in the sample is oxidized to $CO_2$ (using copper oxide wire in air). Carbon dioxide present in the outgoing gas stream is trapped by $Ba(OH)_2$ solution which converts the $CO_2$ to $BaCO_3$. The remaining solution is titrated with HC. and the absorbed quantity of $CO_2$ is determined.

Free Silicon and Silica

If free silicon is in amorphous form, it will be dissolved in hydrofluoric acid. If the silicon is in metallic form, it will not be dissolved in HF, but it can be dissolved in a mixture of $1HF+3HNO_3$. Silicon monoxide is also soluble in $HF+HNO_3$ solution. Silica is soluble in HF acid.

Samples are analyzed in two ways. First, a sample is roasted in the tube furnace to determine the free carbon and then it is treated with hydrofluoric acid and a mixture of hydrofluoric and nitric acids. The residue is pure silicon carbide. The solution after dissolution is analyzed for silicon content by atomic absorption (for the complete mass balance). A similar sample from the same experiment is analyzed in a reverse way. That is, the treatment with the acids comes first and then roasting is performed in the tube furnace.

Physical Characterization

Figure 7:
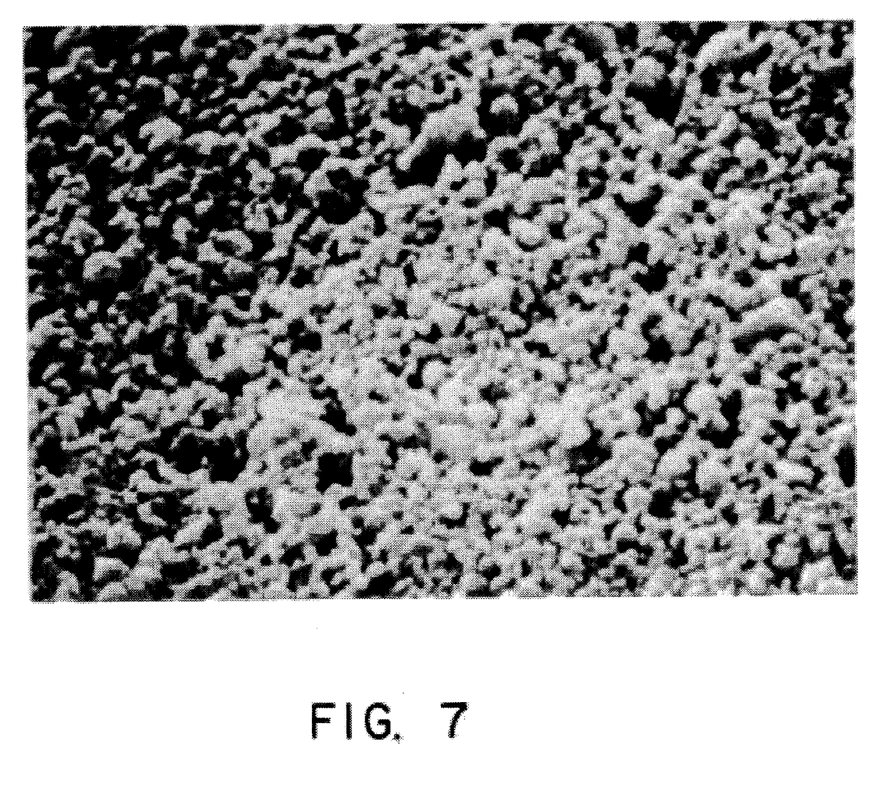
FIG. 7 is a photomicrograph of an SiC powder produced in the system shown in FIG. 1.

Powders produced from each experiment are studied for particle size and morphology using a scanning electron microscope. A photomicrograph of an SiC product sample is shown in FIG. 7. Most of the particles in the micrograph are 0.2–0.4 microns in size.

Particle Size Distribution

Figure 8:
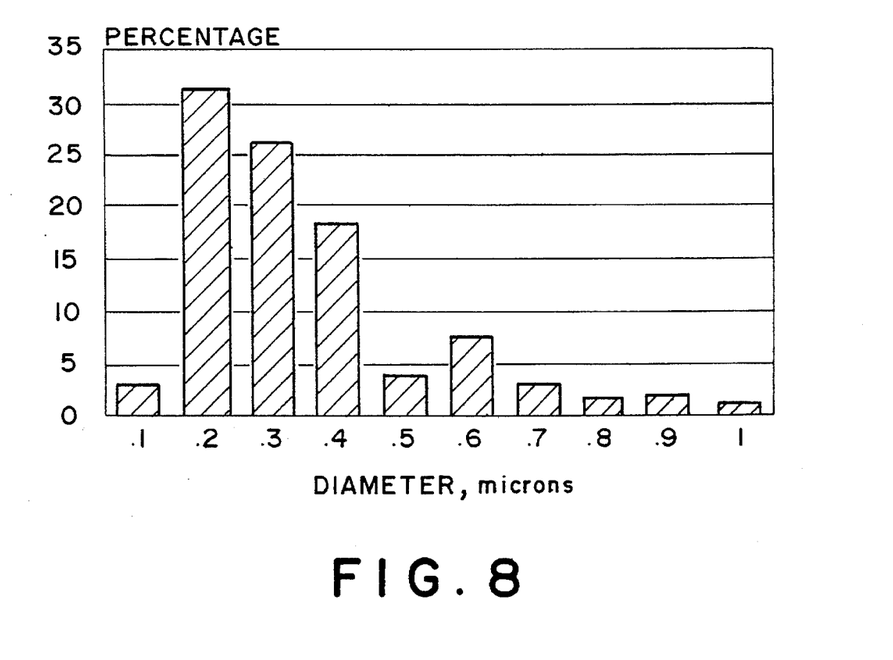
FIG. 8 is a bar chart of the particle size distribution of SiC powder.

Particle size distribution is also very important in the subsequent treatment of the powder. Coulter counter and Horiba particle analyzers are used to study the particle size distribution in this work. The size distribution of the silicon carbide powder from T-31 is shown in FIG. 8. It mainly consists of particles raging in size from 0.2 to 0.4 micron.

REACTION MECHANISMS

Based upon the experimental results and the thermodynamic analysis, the following reaction mechanisms are proposed:

Vaporization Zone (1) The silica vaporizes to form SiO(g) and O(g). This was confirmed by feeding silica only.

(2) The methane cracks to form primarily $H_2(g)$, $C_2H_2(g)$ $C_2H(g)$, and C(s). This was confirmed by feeding methane only.

(3) The O(g) reacts with C(s) to form CO(g).

Reaction Zone (1) The SiO(g) and Si(g) react with $C_2H_2(g)$ and $C_2H(g)$ to form SiC(s). These are gas-gas reactions and require the formation of critical nuclei.

(2) Reactions (1) happen at SiC(s) and C(s) sites.

(3) SiO(g) and Si(g) react with C(s) to form SiC(s). As these are gas-solid reactions, they depend upon the C(s) surface area which is quickly diminished by a coating of SiC.

The yield of silicon carbide could be increased by extending this reaction zone.

Quenching Zone (1) If the quenching is fast enough and the atmosphere is strongly reducing, then no back reactions are possible. Some back reaction was observed experimentally but could be eliminated by faster quenching.

REACTOR MODEL

Models for the heat transfer and fluid flow in the reactor 7 have been developed and evaluated experimentally. The models assume steady state behavior and neglect the flame zone except as a heat and vaporization source.

Heat Transfer Model

Figure 10:
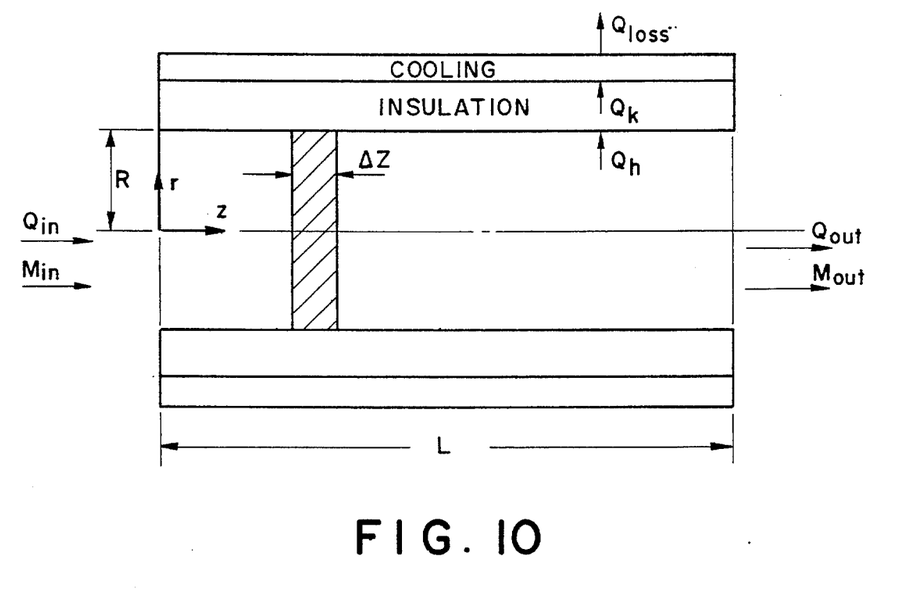
FIG. 10 is a schematic of the model for the laminar flow reactor zone.

A schematic of the model for the laminar flow reactor zone is presented in FIG. 10. An energy balance equation in dimensionless form is:

$$d\Theta/d_{\eta=\lambda 1}[(\Theta-\Theta_w)+\lambda_2 \quad (\Theta^4-\Theta^4)]+\lambda_3[(\Theta-\Theta_{SiO2})+\lambda_4(\Theta^4-\Theta_{SiO2}^4)]+\lambda_5\Theta \quad (\eta=0)=1$$

Dimensionless Groups:

$$\theta = T/T_o \quad \eta = Z/L \quad \theta_w = T_w/T_o \quad \theta_{SiO_2} = T_{SiO_2}/T_o$$
$$\lambda_1 = 2\pi RLh_w/Q_pC_P \quad \lambda_2 = \epsilon_w\sigma T_o^3/h_w$$

$$\lambda_3 = 3\frac{\pi}{R^2}(1-\epsilon)Lh_p/Q_pC_P \quad \lambda_4 = \epsilon_p\sigma T_o^3/h_p$$

$$\lambda_5 = 3R^2(1-\epsilon)LH_ir_iT_o/(r_o^3Q_pC_p)$$

Heat convected and radiated to the walls 51 of the reactor is equal to the heat taken away through the walls 51 by cooling water. In dimensionless form it can be represented as follows:

$$(\theta - \theta_w) + \lambda_2(\theta^4 - \theta_w^4) = (\theta - \theta_{wat})/(\lambda_8 + \text{Constant})$$

Where: $\lambda_8 = f(\theta,\theta_w)$ $$\text{Constant} = \Sigma \text{ Dimensionless Resistances}$$
$$\lambda_8 = h_w/h_{eff} \quad \theta_{wat} = T_{wat}/T_o$$

Mass Transfer Model

It is assumed that the SiO(g) reacts with $C_2H_2(g)$ to form SiC. In this case the concentration of SiO(g) and temperature act as the driving force for the reaction, assuming $C_2H_2$ is in abundance. In the following, a mass transfer equation for SiO concentration is presented in dimensionless form:

$$dX_{SiO}/d_\eta = -[\lambda_6(e^{-\lambda_7/\theta})X_{SiO}]/\theta \quad X_{SiO}(\eta=0)=X_{SiO}^0$$

Dimensionless Groups $$\eta = Z/L \quad \lambda_6 = \pi R^2Pk_oL/MRT_o \quad \lambda_7 = E_A/RT_o$$

These two models are coupled and are solved numerically. The model is the subject of the paper "Fundamentals of Silicon Carbide Synthesis in a Thermal Plasma," by P. R. Taylor and S. A. Pirzada. More detailed models, including heterogeneous kinetics and nucleation and growth kinetics, are the subject of further investigation.

Consolidation and Characterization

The powders that are being produced are suitable for ceramic application by consolidation and sintering. Carbide powders produced pursuant to the present invention can be employed in applications where prior silicon carbide powders, including abrasives, have been used.

| Nomenclature | |
|---|---|
| $T_o$ | average inlet gas temperature (°K.) |
| $T_w$ | wall temperature (°K.) |
| $T_{Si}$ | particle temperature (i = 1 heat up; i = 2 m.p; i = 3 b.p) (°K.) |
| $T_{wat}$ | cooling water temperature (°K.) |
| Q | average gas flow rate (m$_3$/hr) |
| $C_p$ | average gas heat capacity [kJ/(kg. °K.)] |
| ρ | average gas density (kg/m$^3$) |
| R | reactor radius (m) |
| L | reactor length (m) |
| $r_o$ | average solid particle radius (m) |
| $h_w$ | heat transfer coefficient to wall [kJ/(hr · mt$^2$ · °K.)] |
| $h_p$ | heat transfer coefficient to particle [kJ/(hr · mt$^2$ · °K.)] |
| $h_{eff}$ | effective heat transfer coefficient [kJ/(hr · mt$^2$ · °K.)] |
| ε | voidage |
| $ε_w$ | emissivity of wall |
| $ε_p$ | emissivity of particle |
| σ | Boltzman coefficent [kJ/(hr-mt$^2$ °K.$^4$)] |
| $ΔH_i$ | particle enthalpy (i = 1 $H_m$, i = 2 $H_v$, i = 3 $H_{reaction}$) (kJ/mole) |
| $r_i$ | rate (i = 1 heat up, i - 2 melting, i = 3 vaporization) (mole/hr) |
| $X_{SiO}$ | mole fraction SiO |
| P | pressure (kg/m$^2$) |
| $E_A$ | activation energy (kJ/mole) |

What is claimed is:

1. A method of producing ultra-fine ceramic carbides in a reactor using a plasma torch for providing heat to said reactor, said method comprising the steps of:
   (a) injecting materials for reaction at points around a periphery of said torch into a first reaction temperature zone with a temperature above 3000° kelvin., said first reaction temperature zone including a first means for controlling temperatures;
   (b) passing said reactants from said first zone to a second zone with a temperature between 2000° kelvin and 3000° kelvin, said second zone including a second means for controlling temperatures; and
   (c) causing said reactants to enter a third zone for rapid quenching, said third zone having a temperature less than 2000° kelvin, said third zone including a third means for controlling temperatures.

2. The method according to claim 1 wherein said materials are injected at three points around said periphery of said torch.

3. The method according to claim 2 wherein said reactants are in a gaseous state in said first temperature zone, most of a ceramic carbide formation occurs in said second temperature zone, and said third temperature zone is a re-oxidation or quenching zone.

4. A method of producing ultra-fine ceramic carbides, said method comprising the steps of:
   (a) starting a plasma torch on a mixture of argon and helium gases, said torch being attached to a power supply and to a front of a reaction chamber of a reactor;
   (b) preheating said reactor to a predetermined temperature by means of said plasma torch, said argon and helium gases being independently controlled to adjust said torch temperature to said predetermined temperature;
   (c) carrying reactants to said reaction chamber by a carrier gas comprising at least one member selected from the group consisting of methane, argon and mixtures thereof; and
   (d) causing said reactants to enter said reaction chamber, said reaction chamber having a first reaction temperature zone including a first means for controlling temperatures, a second reaction temperature zone including a second means for controlling temperatures, and a third reaction temperature zone including a third means for controlling temperatures.

5. The method of claim 4 wherein said reactants enter said reaction chamber through a graphite or stainless steel ring positioned around the periphery of said plasma torch and said ring attached to the front of said reactor.

6. The method of claim 5 comprising the step of mixing said carrier gas and said reactants using a feeder system comprising a hopper for powder storage, an adjustable speed rotating wheel for mixing, and a vibrating system for continuous flow.

7. The method of claim 5, wherein said reactants exit a collection chamber and are passed through a filter for separating said gases and said reactants.

8. The method of claim 5, including the step of sampling said reactants at various ports along the reactor for determining gas-solid combinations, a temperature of said reactants, and a degree of reaction.

9. The method according to claim 5, wherein said reactants are methane and silica powder, said silica powder comprising 6 to 40 micron particles, said silica powder being mixed with said reactant methane fed at a delivery pressure of approximately 50 psi.

10. Submicron silicon carbide particles produced in the apparatus according to claim 4 having an average particle size of about 0.1 to 1.0 microns, at least 76% of said particles produced having a diameter from about 0.2 to 0.4 microns and further being generally spherical in shape.

11. Submicron silicon carbide particles produced by the method according to claim 4 having an average particle size of about 0.1 to 1.0 microns, at least 76% of said particles produced having a diameter from about 0.2 to 0.4 microns and further being generally spherical in shape.

12. The product of claim 11 comprising a boron carbide or titanium carbide powder, having an average particle size of about 0.1 micron.

* * * * *